(12) United States Patent
Park

(10) Patent No.: US 10,624,514 B2
(45) Date of Patent: Apr. 21, 2020

(54) CLEANER AND CONTROLLING METHOD THEREOF

(71) Applicant: LG ELECTRONICS INC., Seoul (KR)

(72) Inventor: Hyunwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 233 days.

(21) Appl. No.: 15/684,438

(22) Filed: Aug. 23, 2017

(65) Prior Publication Data

US 2018/0249872 A1  Sep. 6, 2018

(30) Foreign Application Priority Data

Mar. 6, 2017  (KR) .......................... 10-2017-0028441

(51) Int. Cl.
 *G06F 19/00* (2018.01)
 *A47L 9/28* (2006.01)
 (Continued)

(52) U.S. Cl.
 CPC ............... *A47L 9/2826* (2013.01); *A47L 5/22* (2013.01); *A47L 9/04* (2013.01); *A47L 9/2852* (2013.01); *A47L 9/2873* (2013.01); *A47L 9/2894* (2013.01); *A47L 11/28* (2013.01); *A47L 11/4005* (2013.01); *A47L 11/4011* (2013.01); *A47L 11/4036* (2013.01); *A47L 11/4061* (2013.01); *G05D 1/0088* (2013.01); *G05D 1/0225* (2013.01); *G05D 1/0242* (2013.01); *G05D 1/0246* (2013.01);
 (Continued)

(58) Field of Classification Search
 None
 See application file for complete search history.

(56) References Cited

U.S. PATENT DOCUMENTS 3,989,311 A * 11/1976 Debrey ...................... A47L 9/19
 406/36
5,995,884 A * 11/1999 Allen .................... G05D 1/0225
 701/24
(Continued)

FOREIGN PATENT DOCUMENTS

CN      1401292        3/2003
KR   10-2002-0080901    10/2002
(Continued)

OTHER PUBLICATIONS

Korean Notice of Allowance dated Mar. 29, 2019 issued in Application No. 10-2017-0028441.
(Continued)

*Primary Examiner* — Bhavesh V Amin
(74) *Attorney, Agent, or Firm* — KED & Associates, LLP

(57) ABSTRACT

A cleaner which performs an autonomous driving, includes: a cleaner body; a driving unit for moving the cleaner body; a camera for detecting 3D coordinate information; a memory for storing pattern information related to a charging station; and a controller for comparing the 3D coordinates information detected by the camera with the pattern information related to the charging station stored in the memory, and for determining whether the charging station is positioned near the cleaner body based on a result of the comparison.

20 Claims, 11 Drawing Sheets

(51) Int. Cl.
  *A47L 5/22* (2006.01)
  *A47L 11/28* (2006.01)
  *A47L 11/40* (2006.01)
  *G06T 7/73* (2017.01)
  *G06K 9/00* (2006.01)
  *G05D 1/00* (2006.01)
  *G05D 1/02* (2020.01)
  *A47L 9/04* (2006.01)

(52) U.S. Cl.
  CPC ..... *G06K 9/00201* (2013.01); *G06K 9/00664* (2013.01); *G06K 9/00805* (2013.01); *G06T 7/74* (2017.01); *A47L 2201/02* (2013.01); *A47L 2201/022* (2013.01); *A47L 2201/04* (2013.01); *G05D 2201/0203* (2013.01); *G06T 2207/10028* (2013.01); *G06T 2207/10048* (2013.01); *G06T 2207/30261* (2013.01)

(56) References Cited

U.S. PATENT DOCUMENTS

| | | | | |
|---|---|---|---|---|
| 6,389,329 | B1* | 5/2002 | Colens | A47L 5/30 700/262 |
| 6,532,404 | B2* | 3/2003 | Colens | A47L 11/4005 180/167 |
| 6,586,908 | B2* | 7/2003 | Petersson | A47L 9/009 320/107 |
| 6,748,297 | B2* | 6/2004 | Song | A47L 9/2805 15/319 |
| 6,836,701 | B2* | 12/2004 | McKee | G05D 1/0274 318/568.11 |
| 6,883,201 | B2* | 4/2005 | Jones | A47L 5/30 15/319 |
| 6,957,712 | B2* | 10/2005 | Song | A47L 9/009 180/117 |
| 7,031,805 | B2* | 4/2006 | Lee | B60L 15/2036 700/245 |
| 7,053,578 | B2* | 5/2006 | Diehl | G05D 1/0225 15/319 |
| 7,133,746 | B2* | 11/2006 | Abramson | G05D 1/0225 700/259 |
| 7,332,890 | B2* | 2/2008 | Cohen | A47L 9/2857 320/109 |
| 7,397,213 | B2* | 7/2008 | Im | G05D 1/0225 318/568.11 |
| 7,489,985 | B2* | 2/2009 | Ko | A47L 9/009 318/568.12 |
| 8,380,350 | B2* | 2/2013 | Ozick | A47L 5/30 700/253 |
| 9,180,596 | B2* | 11/2015 | Sim | G05D 1/0225 |
| 9,238,304 | B1* | 1/2016 | Bradski | B25J 9/163 |
| 9,283,670 | B2* | 3/2016 | Sun | B25J 9/0003 |
| 10,029,368 | B2* | 7/2018 | Wolowelsky | B25J 5/00 |
| 10,209,080 | B2* | 2/2019 | Lindhe | G05D 1/0248 |
| 2002/0153184 | A1 | 10/2002 | Song et al. | |
| 2002/0153185 | A1 | 10/2002 | Song et al. | |
| 2004/0167688 | A1* | 8/2004 | Karlsson | G01C 21/12 701/23 |
| 2005/0010330 | A1* | 1/2005 | Abramson | G05D 1/0225 700/245 |
| 2005/0156562 | A1* | 7/2005 | Cohen | A47L 9/2857 320/107 |
| 2006/0087273 | A1* | 4/2006 | Ko | A47L 9/009 318/568.12 |
| 2007/0050086 | A1 | 3/2007 | Lim et al. | |
| 2007/0114975 | A1* | 5/2007 | Cohen | A47L 9/2857 320/149 |
| 2007/0267998 | A1* | 11/2007 | Cohen | A47L 9/2857 320/109 |
| 2008/0007203 | A1* | 1/2008 | Cohen | A47L 9/2857 320/104 |
| 2009/0228165 | A1* | 9/2009 | Ozick | A47L 5/30 701/23 |
| 2012/0049798 | A1* | 3/2012 | Cohen | A47L 9/2857 320/109 |
| 2014/0257564 | A1* | 9/2014 | Sun | B25J 9/0003 700/259 |
| 2014/0288709 | A1* | 9/2014 | Sim | G05D 1/0225 700/259 |
| 2016/0129593 | A1* | 5/2016 | Wolowelsky | B25J 5/00 700/253 |
| 2016/0144512 | A1* | 5/2016 | Kim | H04N 13/246 15/319 |
| 2016/0271795 | A1* | 9/2016 | Vicenti | B25J 9/163 |
| 2016/0298970 | A1* | 10/2016 | Lindhe | G05D 1/0248 |
| 2018/0304463 | A1* | 10/2018 | Wolowelsky | B25J 5/00 |

FOREIGN PATENT DOCUMENTS

| | | |
|---|---|---|
| KR | 10-0406636 | 11/2003 |
| KR | 10-2004-0062040 | 7/2004 |
| KR | 10-2006-0110483 | 10/2006 |
| KR | 10-0645381 | 11/2006 |
| KR | 10-2008-0015985 | 2/2008 |
| KR | 10-2009-0111170 | 10/2009 |
| KR | 10-2012-0118818 | 10/2012 |

OTHER PUBLICATIONS

International Search Report dated Dec. 7, 2017 issued in Application No. PCT/KR2017/007851.
Taiwanese Office Action dated Nov. 28, 2018 issued in TW Application No. 106128472.

\* cited by examiner

CLEANER AND CONTROLLING METHOD THEREOF

CROSS-REFERENCE TO RELATED APPLICATION(S)

Pursuant to 35 U.S.C. § 119(a), this application claims the benefit of earlier filing date and right of priority to Korean Application No. 10-2017-0028441, filed on Mar. 6, 2017, the contents of which is incorporated by reference herein in its entirety.

BACKGROUND

1. Field

The present disclosure relates to a cleaner and a controlling method thereof, and more particularly, to a cleaner capable of recognizing an obstacle and performing an autonomous driving, and a method for controlling the same.

2. Background

Generally, a robot has been developed for an industrial use, and has managed some parts of factory automation. As the robot is applied to various fields recently, not only medical robots and space robots, but also home robots are being developed.

A representative of the home robot is a robot cleaner, a kind of home electronic appliance capable of performing a cleaning operation by sucking dust or foreign materials while autonomously moving on a predetermined region. Such robot cleaner is provided with a chargeable battery, and is provided with an obstacle sensor for avoiding an obstacle while autonomously moving.

Recently, research is actively ongoing in order to utilize a robot cleaner in various fields such as a health care, a smart home and a remote control, beyond the general concept that a robot cleaner performs a cleaning while autonomously moving on a cleaning region. In a case where a robot cleaner performs an autonomous driving on a cleaning region, the amount of a battery may become lower than a limited value during a cleaning operation. Accordingly, in the case, for a smooth autonomous driving of the robot cleaner, the robot cleaner moves to a charging station installed within the cleaning region to charge the battery.

Korean Laid-Open Publication Patent No. 10-2009-0111170 (Publication Date: Oct. 26, 2009) discloses a configuration to transmit a distance signal for distance measurement, to receive a guidance signal, or to change a moving direction, for precise docking. However, in a robot cleaner system according to the Korean Laid-Open Publication Patent No. 10-2009-0111170, a robot cleaner detects a position of a charging station by using an infrared ray (IR) sensor provided at the charging station. This may cause a difficulty in precisely detecting the position of the charging station. Further, if the position of the charging station is not precisely detected, a charging terminal provided at the robot cleaner cannot precisely perform a docking operation with a power supply terminal provided at the charging station.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
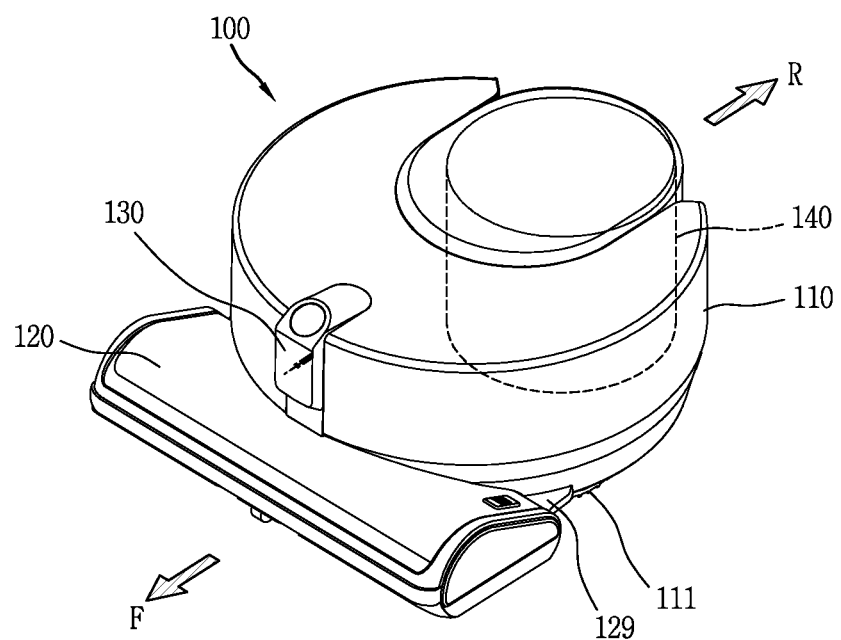
FIG. 1 is a perspective view showing an example of a cleaner which performs an autonomous driving, according to the present disclosure.
Figure 2:
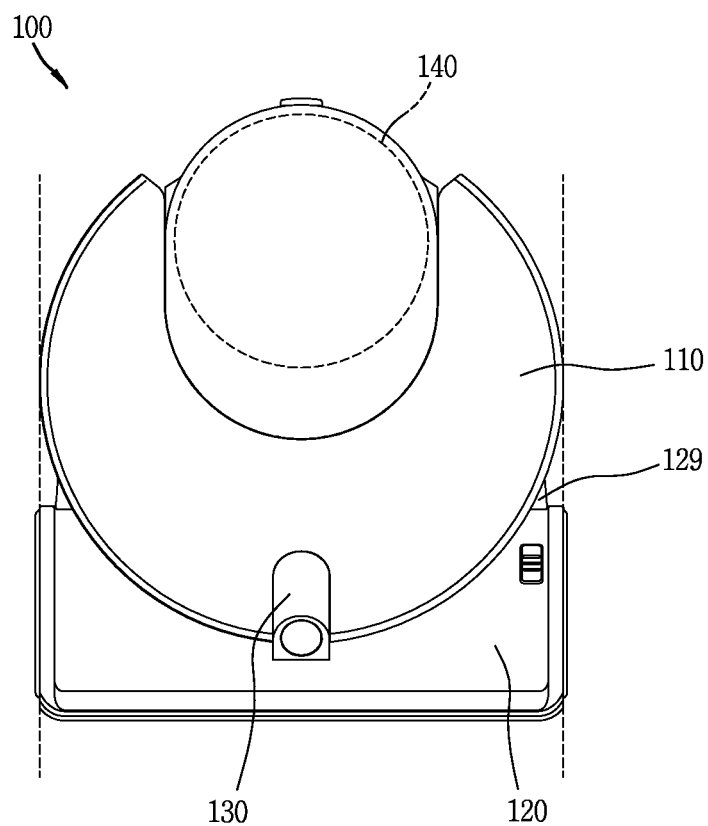
FIG. 2 is a planar view of the cleaner which performs an autonomous driving shown in FIG. 1.
Figure 3:
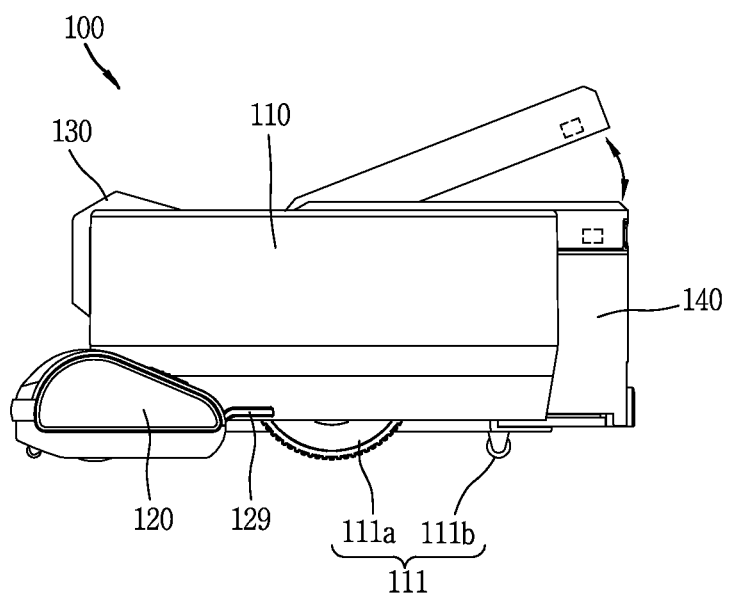
FIG. 3 is a lateral view of the cleaner which performs an autonomous driving shown in FIG. 1.

Referring to FIGS. 1 to 3, the robot cleaner 100 performs a function to clean a floor by sucking dust (including foreign materials) on the floor or by mopping the floor, while autonomously moving on a predetermined region. In the specification, a moving robot, a robot cleaner, a general cleaner, and a cleaner which performs an autonomous driving may have the same meaning.

The robot cleaner 100 includes a cleaner body 110, a suction unit 120, a sensing unit 130, and a dust container 140. The cleaner body 110 is provided with a controller (not shown) for controlling the robot cleaner 100, and a wheel unit 11 for driving the robot cleaner 100. The robot cleaner 100 may be moved or rotated by the wheel unit 111, back and forth and right and left.

The wheel unit 111 includes main wheels 111a and a sub wheel 111b. The main wheels 111a are provided at both sides of the cleaner body 110, and are rotatable in one direction or another direction according to a control signal of a controller. The main wheels 111a may be driven independently. For instance, each of the main wheels 111a may be driven by a different motor. The sub wheel 111b is configured to support the cleaner body 110 together with the main wheels 111a, and to assist a driving of the robot cleaner 100 by the main wheels 111a. The sub wheel 111b may be also provided at the suction unit 120 to be explained later. As aforementioned, the robot cleaner 100 autonomously moves on a floor as the controller controls a driving of the wheel unit 111.

A battery (not shown) for supplying a power to the robot cleaner 100 is mounted to the cleaner body 110. The battery is formed to be chargeable, and may be detachably formed at a bottom surface of the cleaner body 110.

The suction unit 120 is provided to protrude from one side of the cleaner body 110, and is configured to suck dust-included air. The one side may be a side where the cleaner body 110 moves in a forward direction (F), i.e., a front side of the cleaner body 110. In the drawings, the suction unit 120 is protruded from one side of the cleaner body 110, towards a front side and right and left sides. More specifically, a front end of the suction unit 120 is provided at a position forward-spaced from one side of the cleaner body 110, and right and left ends of the suction unit 120 are provided at positions spaced from one side of the cleaner body 110 towards right and left sides.

The cleaner body 110 is formed to have a circular shape, and both sides of a rear end of the suction unit 120 are protruded from the cleaner body 110 towards right and left sides. As a result, an empty space (a gap) may be formed between the cleaner body 110 and the suction unit 120. The empty space, a space between right and left ends of the cleaner body 110 and right and left ends of the suction unit 120, is recessed towards the inside of the robot cleaner 100.

If an obstacle is positioned at the empty space, the robot cleaner 100 may not move due to the obstacle. In order to solve such a problem, a cover member 129 may be provided to cover at least part of the empty space. The cover member 129 may be provided at the cleaner body 110 or the suction unit 120. In this embodiment, the cover members 129 protrude from both sides of a rear end of the suction unit 120, thereby covering an outer circumferential surface of the cleaner body 110. The cover member 129 is provided to fill at least part of the empty space between the cleaner body 110 and the suction unit 120. This may prevent an obstacle from being positioned in the empty space, or may allow the robot cleaner to be easily separated from an obstacle provided in the empty space.

The cove member 129 protruded from the suction unit 120 may be supported on an outer circumferential surface of the cleaner body 110. If the cover member 129 protrudes from the cleaner body 110, the cover member 129 may be supported on a rear surface of the suction unit 120. Under such a structure, when the suction unit 120 has an impact by colliding with an obstacle, the impact may be distributed as part of the impact is transferred to the cleaner body 110.

The suction unit 120 may be detachably coupled to the cleaner body 110. Once the suction unit 120 is separated from the cleaner body 110, a mop module (not shown) may be detachably coupled to the cleaner body 110 by replacing the separated suction unit 120. Thus, a user may mount the suction unit 120 to the cleaner body 110 in case of removing dust on a floor, and may mount the mop module to the cleaner body 110 in case of mopping a floor.

When the suction unit 120 is mounted to the cleaner body 110, the mounting may be guided by the aforementioned cover member 129. That is, as the cover member 129 is provided to cover an outer circumferential surface of the cleaner body 110, a relative position of the suction unit 120 with respect to the cleaner body 110 may be determined.

The sensing unit (or sensor) 130 is provided at the cleaner body 110. As shown, the sensing unit 130 may be provided at one side of the cleaner body 110 where the suction unit 120 is positioned, i.e., a front side of the cleaner body 110. The sensing unit 130 may be provided to overlap the suction unit 120 in upper and lower directions of the cleaner body 110. The sensing unit 130 is provided above the suction unit 120, and is configured to sense an obstacle or a terrain feature provided at a front side, for prevention of collision of the suction unit 120 provided at a foremost side of the robot cleaner 100, with the obstacle. The sensing unit 130 is configured to additionally perform other sensing functions rather than such a sensing function. This will be explained later in more detail.

A dust container accommodating portion is provided at the cleaner body 110, and the dust container 140 for collecting dust included in sucked air in a separated manner is detachably coupled to the dust container accommodating portion. The dust container accommodating portion may be formed at a side of the cleaner body 110 that is opposite the suction unit 120, i.e., a rear side of the cleaner body 110.

One part of the dust container 140 may be accommodated in the dust container accommodating portion, and another part thereof may protrude towards a rear side of the cleaner body 110 (i.e., in a reverse direction (R) to the forward direction (F)). The dust container 140 is provided with an inlet through which dust-included air is introduced, and an outlet through which dust-separated air is discharged out. When the dust container 140 is mounted to the dust container accommodating portion, the inlet and the outlet are communicated with a first opening and a second opening formed on an inner side wall of the dust container accommodating portion, respectively. An air suction passage inside the cleaner body 110 corresponds to a passage from an inlet (not shown) communicated with a communication portion to the first opening, and an air discharge passage corresponds to a passage from the second opening to an outlet.

With such a configuration, dust-included air introduced through the suction unit 120 is introduced into the dust container 140 via the air suction passage inside the cleaner body 110, and is separated from the dust while passing through a filter of the dust container 140 or a cyclone. The dust is collected in the dust container 140, and the air is discharged from the dust container 140. Then, the air passes through the air discharge passage inside the cleaner body 110, and is finally discharged out through the outlet.

Figure 4:
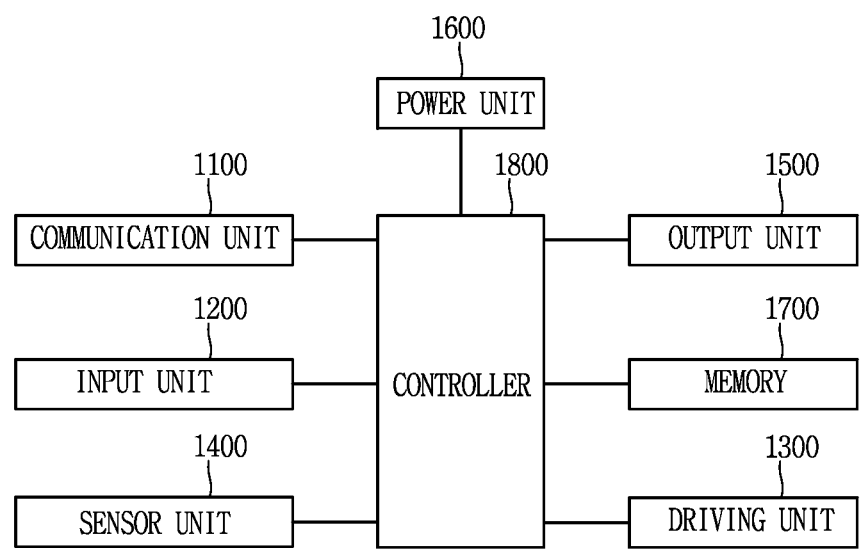
FIG. 4 is a block diagram showing components of a cleaner which performs an autonomous driving, according to an embodiment of the present disclosure.

FIG. 4 shows components of the robot cleaner 100 according to an embodiment of the present disclosure. The robot cleaner 100 (or the moving robot) according to an embodiment of the present disclosure may include at least one of a communication unit (or transceiver) 1100, an input unit (or input device) 1200, a driving unit (or motor) 1300, a sensing unit (or sensor) 1400, an output unit (or output device) 1500, a power unit (or a batter) 1600, a memory 1700 and a controller (or a processor) 1800, or a combination thereof. The components shown in FIG. 4 are not absolutely necessary, and fewer or more components of the robot cleaner may be implemented. Hereinafter, each of the components will be explained.

The power unit 1600 is provided with a battery chargeable by an external commercial power, and supplies a power to the robot cleaner. The power unit 1600 may supply a driving power to each of the components of the robot cleaner, thereby supplying an operation power required for the robot cleaner to move or to perform a specific function.

Here, the controller 1800 may sense a remaining amount of power of the battery. If the remaining amount of the power is small, the controller 1800 may control the robot cleaner to move to a charging plate connected to an external commercial power or another power supply, in order to charge the battery by receiving a charging current from the charging plate. The battery may be connected to a battery sensing unit, and the remaining amount of the power and a charging state of the battery may be transmitted to the controller 1800. The output unit 1500 may display the remaining amount of the power of the battery, on a screen, under control of the controller.

The battery may be positioned at a part below a central region of the robot cleaner, or may be positioned at one of right and left sides of the robot cleaner. In the latter case, the robot cleaner may be further provided with a balance weight to prevent a concentrated (biased) state of the battery.

The driving unit 1300 is provided with a motor, and may rotate or move the cleaner body by rotating the right and left main wheels in two directions, by driving the motor. The driving unit 1300 may move the cleaner body of the robot cleaner back and forth and right and left, or in a curved manner, or on the spot (in place).

The input unit 1200 receives various control commands with respect to the robot cleaner, from a user. The input unit 1200 may include one or more buttons. For instance, the input unit 1200 may include an ok button, a setting button, etc. The ok button is used to receive, from a user, a command instructing check of sensing information, obstacle information, position information and map information. And the setting button is used to receive, from a user, a command to set the plurality of information. Further, the input unit 1200 may include an input resetting button for canceling a previous user input and receiving a user input again, a deletion button for deleting a preset user input, a button for setting or changing an operation mode, a button for receiving a command to return to a charging plate, etc. Further, the input unit 1200 may be installed at an upper part of the robot cleaner, in the form of a hard key, a soft key, a touch pad, etc. And the input unit 1200 may be implemented in the form of a touch screen together with the output unit 1500.

The output unit 1500 may be installed at an upper part of the robot cleaner. The installation position and the installation form may be changed. For instance, the output unit 1500 may display, on a screen, a battery state, a driving method, etc. The output unit 1500 may output information on an internal state of the robot cleaner detected by the sensing unit 1400, e.g., a current state of each component included in the robot cleaner. Further, the output unit 1500 may display, on the screen, information on an external state of the robot cleaner detected by the sensing unit 1400, i.e., obstacle information, position information, map information, etc. The output unit 1500 may be implemented as one of a light emitting diode (LED), a liquid crystal display (LCD) device, a plasma display panel, and an organic light emitting diode (OLED).

The output unit 1500 may further include an audio output means for audibly outputting operation procedures or an operation result of the robot cleaner performed by the controller 1800. For instance, the output unit 1500 may output an alarm sound to the outside, according to an alarm signal generated by the controller 1800. Here, the audio output means may be a sound outputting means such as a beeper and a speaker, and the output unit 1500 may output a sound to the outside through the audio output means, by using audio data or message data having a predetermined pattern and stored in the memory 1700.

Thus, the robot cleaner according to an embodiment of the present disclosure may output environment information about a running region, on the screen, or in the form of a sound, through the output unit 1500. According to another embodiment of the present disclosure, the robot cleaner may transmit map information or environment information to a terminal device (e.g., a smart phone, a tablet computer, a desktop or laptop computer, a remote server or computer, etc.) through the communication unit 1100, such that the terminal device may output a screen or a sound to be output through the output unit 1500.

The communication unit 1100 is connected to the terminal device and/or another device positioned within a specific area (which will be also referred to as "a home appliance" in this specification), by one of a wired communication method, a wireless communication method and a satellite communication method, for transception (transmission and reception) of a signal and data.

The communication unit 1100 may transmit and receive data to/from another device positioned within a specific area. Said another device may be any device which can transceive data in a connected state to a network. For instance, said another device may be an air conditioner, a heating device, an air purifier, an electric lamp, a television, a vehicle, etc. Alternatively, said another device may be a device for controlling a door, a window, a faucet valve (a tap valve), a gas valve, etc. Alternatively, said another device may be a sensor for sensing a temperature, a humidity, an air pressure, a gas, etc.

The memory 1700 stores therein a control program for controlling or driving the robot cleaner, and related data. The memory 1700 may also store therein audio information, image information, obstacle information, position information, map information, etc. The memory 1700 may also store therein information related to a driving pattern.

As the memory 1700, a non-volatile memory is mainly used. The non-volatile memory (NVM, NVRAM) is a storage device capable of continuously maintaining information stored therein even when a power is not supplied thereto. For instance, the non-volatile memory may be a ROM, a flash memory, a magnetic computer memory (e.g., a hard disc, a diskette drive, or a magnetic tape), an optical disc drive, a magnetic RAM, PRAM, etc.

The sensing unit 1400 may include at least one of an external signal sensor, a front side sensor, a cliff sensor, a lower camera sensor, an upper camera sensor, and a three-dimensional (3D) camera sensor. The external signal sensor may sense an external signal of the robot cleaner. For instance, the external signal sensor may be an infrared ray sensor, an ultrasonic sensor, a radio frequency (RF) sensor, etc.

The robot cleaner may check a position and a direction of a charging plate by receiving a guide signal generated from the charging plate, by using the external signal sensor. Here, the charging plate may generate a guide signal indicating a direction and a distance such that the robot cleaner can return to the charging plate. That is, the robot cleaner may determine a current position by receiving a signal generated from the charging plate, and may return to the charging plate by setting a moving direction.

The front side sensor may be installed on a front side of the robot cleaner, more specifically, on a lateral outer circumferential surface of the robot cleaner, at preset intervals therebetween. The front side sensor, provided on at least one side surface of the robot cleaner and configured to sense a front obstacle, may sense an object which exists in a moving direction of the robot cleaner, especially, an obstacle. Then, the front side sensor may transmit detection information to the controller 1800. That is, the front sensor may sense a protruding object which exists on a moving path of the robot cleaner, a home object, furniture, a wall surface, a wall edge, etc., and may transmit related information to the controller 1800.

For instance, the front side sensor may be an infrared ray sensor, an ultrasonic sensor, a radio frequency (RF) sensor, a geomagnetic sensor, etc. As the front side sensor, the robot cleaner may use the same type of sensors, or two or more types of sensors if necessary. For instance, an ultrasonic sensor may be mainly used to detect an obstacle which is provided at a remote distance. The ultrasonic sensor is provided with a signal transmitting portion and a signal receiving portion, and the controller 1800 may determine whether an obstacle exists or not by determining whether an ultrasonic wave emitted from the signal transmitting portion is received by the signal receiving portion after being reflected from the obstacle, etc. Then, the controller 1800 may calculate a distance to the obstacle, based on an ultrasonic wave emitting time and an ultrasonic wave receiving time.

And the controller 1800 may detect information on a size of an obstacle, by comparing ultrasonic waves emitted from the signal generating portion, with ultrasonic waves received by the signal receiving portion. For instance, the controller 1800 may determine that an obstacle has a large size when a large amount of ultrasonic waves are received by the signal receiving portion.

In an embodiment, a plurality of (e.g., 5) ultrasonic sensors may be installed on front side surfaces of the robot cleaner, along an outer circumferential surface. Preferably, the ultrasonic sensors may be installed on a front surface of the robot cleaner such that signal transmitting portions and signal receiving portions are alternate with each other. That is, the signal transmitting portions may be arranged on right and left sides based on a central region of a front surface of the cleaner body, in a spaced manner. And one or at least two signal transmitting portions may be arranged between the signal receiving portions, thereby forming a receiving region of ultrasonic waves reflected from an obstacle, etc. This may reduce the number of sensors, and may expand a signal receiving region. In order to prevent a crosstalk phenomenon, an ultrasonic wave transmitting angle may be maintained within a range not to influence on different signals. And the signal receiving portions may be set to have different reception sensitivities.

The ultrasonic sensor may be installed so as to be upward by a predetermined angle, such that ultrasonic waves generated from the ultrasonic sensor may be upward output. In this case, a shielding member for preventing downward emission of ultrasonic waves may be further included.

As aforementioned, as the front side sensor, two or more types of sensors may be used. Accordingly, the front side sensor may be implemented as one of an infrared ray sensor, an ultrasonic sensor, an RF sensor, etc. For instance, the front side sensor may include an infrared ray sensor, as another type of sensor rather than the ultrasonic sensor.

The infrared ray sensor may be installed on an outer circumferential surface of the robot cleaner together with the ultrasonic sensor. The infrared ray sensor may detect an obstacle which exists at a front side or on a side surface of the robot cleaner, and may transmit obstacle information to the controller 1800. That is, the infrared ray sensor may sense a protruding object which exists on a moving path of the robot cleaner, a home object, furniture, a wall surface, a wall edge, etc., and may transmit related information to the controller 1800. Accordingly, the cleaner body of the robot cleaner may move within a specific area without colliding with an obstacle.

The cliff sensor may sense an obstacle on a floor which supports the cleaner body of the robot cleaner, by using various types of optical sensors. That is, the cliff sensor is installed on a rear surface of the robot cleaner on a floor, and may be installed on a different position according to a type of the robot cleaner. The cliff sensor, configured to sense an obstacle on a floor by being positioned on a rear surface of the robot cleaner, may be an infrared ray sensor having a signal transmitting portion and a signal receiving portion like the obstacle sensor. Alternatively, the cliff sensor may be an ultrasonic sensor, an RF sensor, a Position Sensitive Detector (PSD) sensor, etc.

For instance, one cliff sensor may be installed at a front side of the robot cleaner, and two cliff sensors may be installed at a rear side of the robot cleaner. For instance, the cliff sensor may be a PSD sensor, and may be implemented as different types of sensors.

The PSD sensor senses a short wavelength distance of incident light by using one p-n junction using a surface resistance of a semiconductor. The PSD sensor includes a primary PSD sensor for sensing light only in one axis direction, and a secondary PSD sensor for sensing a light position on a plane. Both of the primary PSD sensor and the secondary PSD sensor may have a pin photo diode structure. The PSD sensor, a type of infrared ray sensor, measures a distance by transmitting an infrared ray and then by measuring an angle of the infrared ray which returns after being reflected from an obstacle. That is, the PSD sensor calculates a distance to an obstacle by using a triangulation method.

The PSD sensor is provided with a light emitting portion for emitting an infrared ray to an obstacle, and a light receiving portion for receiving the infrared ray which returns by being reflected from the obstacle. Generally, the PSD sensor is implemented in the form of a module. In case of sensing an obstacle by using the PSD sensor, a stable measurement value may be obtained regardless of a reflectivity and a color of the obstacle.

The controller 1800 may sense a cliff and may analyze a depth, by measuring an infrared ray angle between a light emitting signal of an infrared ray emitted towards a floor surface by the cliff sensor, and a reflection signal received after being reflected from an obstacle. The controller 1800 may determine whether the robot cleaner can pass through a cliff based on a floor surface state of the cliff sensed by the cliff sensor, and may decide whether to pass through the cliff according to a result of the determination. For instance, the controller 1800 may determine whether a cliff exists or not and a depth of the cliff, through the cliff sensor. Then, only when a reflection signal is sensed through the cliff sensor, the controller 1800 controls the robot cleaner to pass through the cliff. As another example, the controller 1800 may determine a lifted state of the robot cleaner by using the cliff sensor.

The lower camera sensor is provided on a rear surface of the robot cleaner, and obtains image information about a floor surface (or a surface to be cleaned) while the robot cleaner is moving. The lower camera sensor is also referred to as an optical flow sensor. The lower camera sensor generates a predetermined type of image data by converting an image related to a floor surface (or a surface to be cleaned), the image input from an image sensor provided in the lower camera sensor. The generated image data may be stored in the memory 1700.

One or more light sources may be installed near an image sensor. The one or more light sources irradiate light onto a predetermined region of a floor surface captured by the image sensor. That is, in a case where the robot cleaner moves within a specific area along a floor surface, if the floor surface is flat, a distance between the image sensor and the floor surface is constantly maintained. On the other hand, in a case where the robot cleaner moves along a floor surface having a non-uniform surface, the image sensor becomes far from the floor surface by more than a predetermined distance, due to a concavo-convex portion and an obstacle on the floor surface. Here, the controller 1800 may control the one or more light sources to control the amount of light to be irradiated. The light source may be a light emitting device which can control an optical amount, e.g., a light emitting diode (LED).

The controller 1800 may detect a position of the robot cleaner regardless of a sliding of the robot cleaner (e.g., even when the wheels 111 are not moving or when the robot cleaner is not travelling in a direction unassociated with a movement of the wheels 111), by using the lower camera sensor. The controller 1800 may calculate a moving distance and a moving direction by analyzing image data captured by the lower camera sensor according to time, thereby calculating a position of the robot cleaner. The controller 1800 may compensate for a sliding of the robot cleaner on a position calculated by another means, based on image information on a lower part of the robot cleaner captured by the lower camera sensor.

The upper camera sensor may be installed to be towards an upper side or a front side of the robot cleaner, thereby capturing the periphery of the robot cleaner. If the robot cleaner is provided with a plurality of upper camera sensors, the upper camera sensors may be provided on an upper part or a side surface of the robot cleaner with a predetermined distance or a predetermined angle therebetween.

The 3D camera sensor may be attached to one surface or a part of the cleaner body of the robot cleaner, thereby generating 3D coordinates information related to the periphery of the cleaner body. That is, the 3D camera sensor may be a 3D depth camera for calculating a distance between the robot cleaner and an object to be captured. More specifically, the 3D camera sensor may capture two-dimensional (2D) images related to the periphery of the cleaner body, and may generate a plurality of 3D coordinates information corresponding to the captured 2D images. In an embodiment, the 3D camera sensor may be provided with the conventional two or more cameras for capturing 2D images, and may be implemented as a stereo vision type for generating 3D coordinates information by combining two or more images captured by the two or more cameras.

More specifically, in this embodiment, the 3D camera sensor may include a first pattern irradiating portion for downward irradiating light of a first pattern towards a front side of the cleaner body, a second pattern irradiating portion for upward irradiating light of a second pattern towards a front side of the cleaner body, and an image acquiring portion for acquiring images related to a front side of the cleaner body. Accordingly, the image acquiring portion may acquire an image about a region on which light of the first pattern and light of the second pattern have been incident.

In another embodiment, the 3D camera sensor may be provided with a single camera and an infrared ray pattern emitting portion for irradiating an infrared ray pattern. And the 3D camera sensor may measure a distance between itself and an object to be captured, by capturing a projection shape of an infrared ray pattern irradiated from the infrared ray pattern emitting portion, onto the object to be captured. The 3D camera sensor may be an infra-red (IR) type of 3D camera sensor.

In another embodiment, the 3D camera sensor may be provided with a single camera and a light emitting portion for emitting light. And the 3D camera sensor may measure a distance between itself and an object to be captured, by analyzing a part of laser emitted from the light emitting portion, the part reflected from the object to be captured. The 3D camera sensor may be a time of flight (TOF) type of 3D camera sensor.

More specifically, the 3D camera sensor is configured to irradiate a laser extended in at least one direction. For instance, the 3D camera sensor may be provided with a first laser portion and a second laser portion. And the first laser portion may irradiate straight type lasers crossing each other, and the second laser portion may irradiate a single straight type laser. With such a configuration, a lowermost laser is used to sense an obstacle on a floor surface, an uppermost laser is used to sense an obstacle provided at an upper region, and an intermediate laser between the lowermost laser and the uppermost laser is used to sense an obstacle provided at a middle region.

Figure 5:
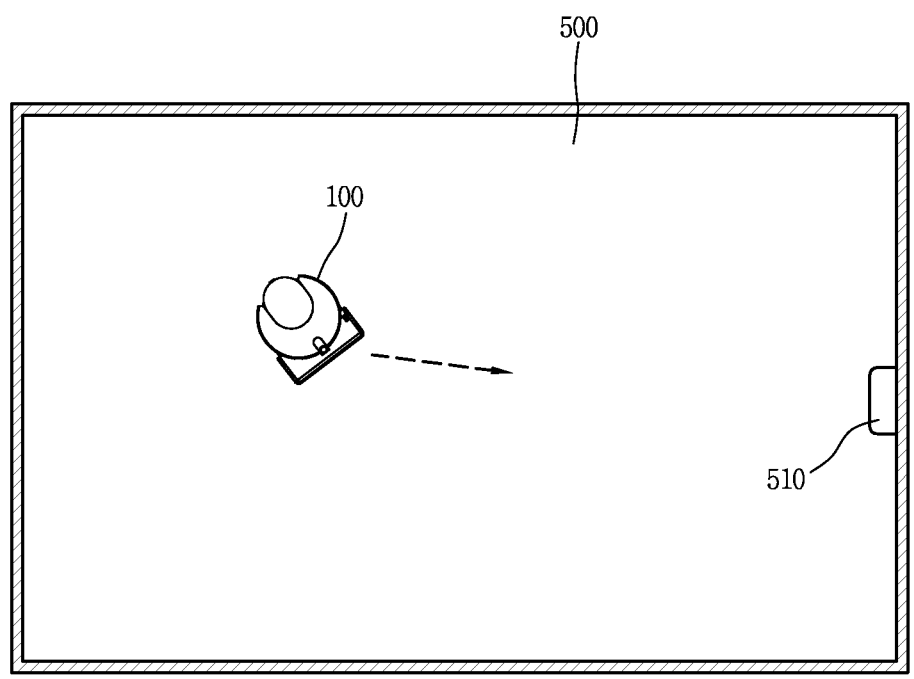
FIG. 5 is a conceptual view showing an example to install a cleaner and a charging station at a cleaning region, according to the present disclosure.

FIG. 5 illustrates an embodiment showing an installed state of the robot cleaner 100 and a charging station 510 within a cleaning region. As shown in FIG. 5, the charging station 510 for charging the battery of the robot cleaner 100 may be installed within a cleaning region 500. In another embodiment, the charging station 510 may be installed outside the cleaning region 500 but at a location that is reachable by the robot cleaner 100.

Although not shown in FIG. 5, the charging station 510 may be provided with a communication device (not shown) for outputting different types of signals, and the communication device may perform wireless communication with the communication unit 1100 of the robot cleaner 100. The controller 1800 may control the driving unit 1300 such that the cleaner body of the robot cleaner 100 may be docked at the charging station 510, based on a signal received by the communication unit 1100 from the charging station 510.

If a remaining amount of the battery is less than a limited (or threshold) value, the controller 1800 may move the cleaner body toward the charging station 510. If the cleaner body is near (i.e., within a threshold distance from) the charging station 510, the controller 1800 may control the driving unit 1300 to start a docking operation.

Figure 6A:
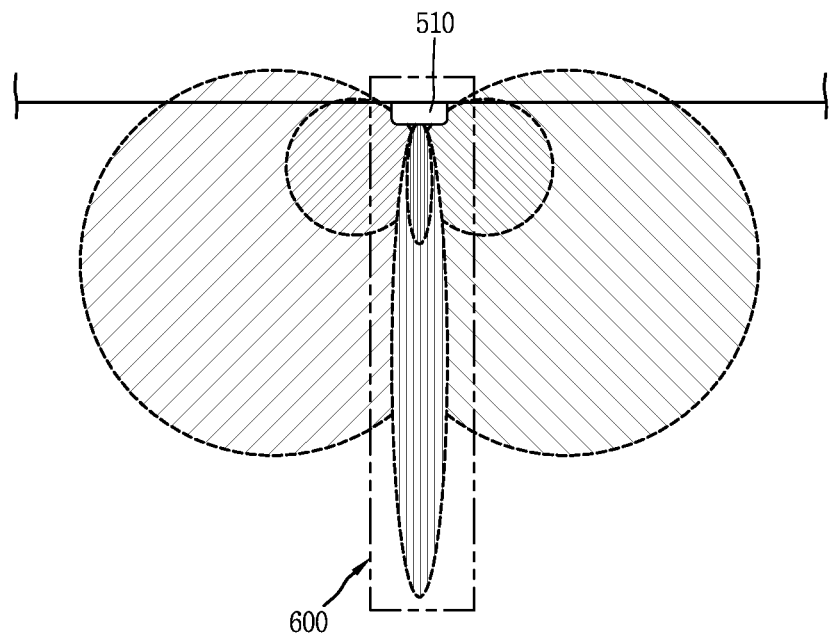
FIGS. 6A to 6D are conceptual views showing signals emitted from a charging station according to an embodiment of the present disclosure.

FIGS. 6A to 6D show emission states of a plurality of signals. Referring to FIG. 6A, a plurality of signals may be generated from the charging station 510. A region 600 where a plurality of signals are overlapped with each other may be formed at a front side of the charging station 510.

Figure 6B:
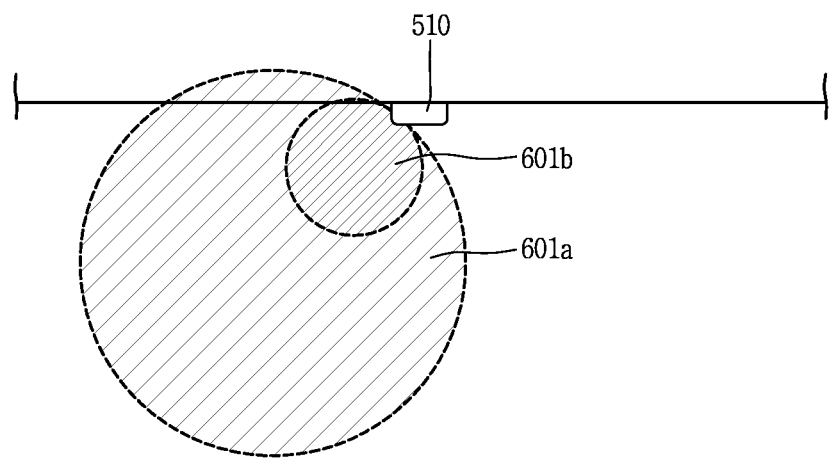

FIG. 6B shows an emission state of a first signal, which may include an entire emission region 601a of the first signal, and a concentrated emission region 601b of the first signal. More specifically, the first signal may include a first short-distance signal, and a first long-distance signal. That is, the charging station 510 may emit the first short-distance signal and the first long-distance signal. Accordingly, a region to which both of the first short-distance signal and the first long-distance signal are transmitted may correspond to the concentrated emission region 601b, and a region to which only the first long-distance signal is transmitted may correspond to the entire emission region 601a.

Figure 6C:
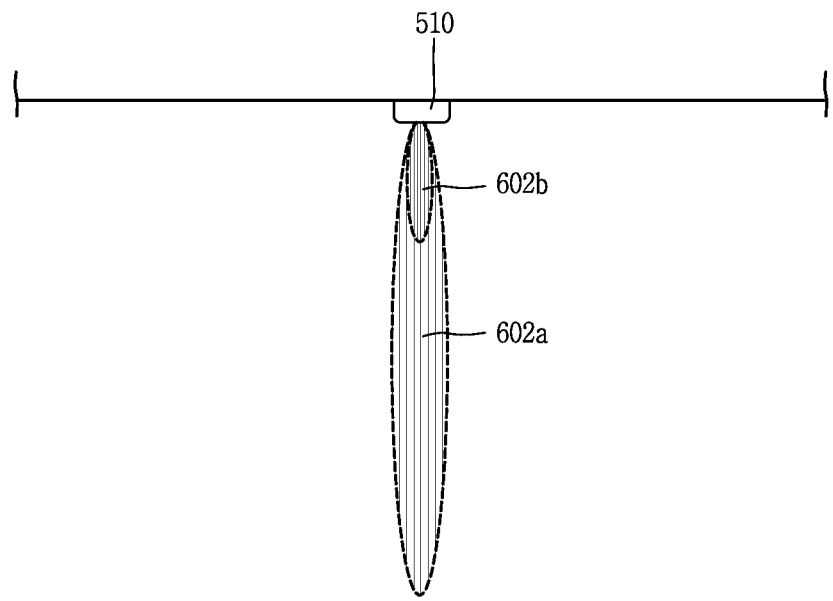
Figure 6D:
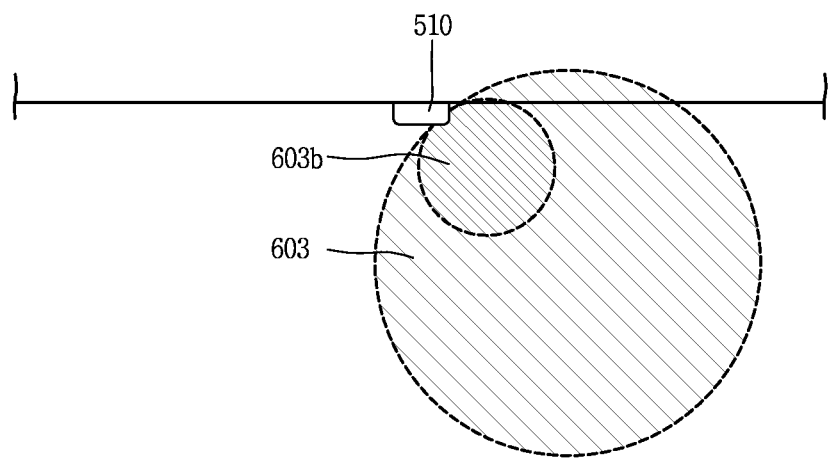

Likewise, FIGS. 6C and 6D show an emission state of second and third signals, which may include an entire emission region 602a of the second signal, a concentrated emission region 602b of the second signal, an entire emission region 603a of the third signal, and a concentrated emission region 603b of the third signal. The second signal may include a second short-distance signal and a second long-distance signal, and the third signal may include a third short-distance signal and a third long-distance signal. As previously described with respect to FIG. 6A, the second signal may correspond to an overlap of the first and third signals and may not be separately transmitted signal. All of the first to third signals shown in FIG. 6B to 6D may be emitted, or only the first and third signals may be emitted, according to a user's selection.

Referring back to FIG. 6A, a region 600 where the first to third signals are overlapped with each other may be formed. The region 600 is formed at a front side of the charging station 510. Accordingly, if it is determined that the cleaner body of the robot cleaner 100 is positioned at the region 600 and a front surface of the cleaner body faces the charging station 510, the controller 1800 may perform a docking operation between the robot cleaner and the charging station by merely forward-moving the cleaner body.

Figure 6E:
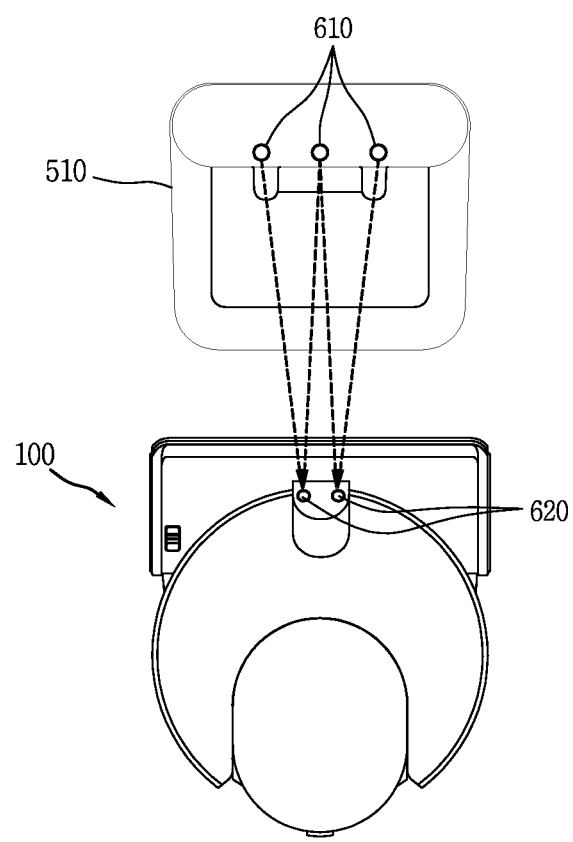
FIG. 6E is a conceptual view showing a method of performing a docking operation between a cleaner and a charging station according to the conventional art.

FIG. 6E shows a method for a general cleaner to detect a position of the charging station 510 by using only an infrared ray sensor (IR sensor) provided at the charging station. As shown in FIG. 6E, a general cleaner (or robot cleaner) 100 may be provided with an infrared ray signal receiving portion 620 for receiving a signal transmitted from infrared ray sensors (or emitters) 610 provided at the charging station.

Referring to FIG. 6E, the plurality of infrared ray sensors 610 provided at the charging station emit infrared ray signals in a plurality of directions. The infrared ray signal receiving portion 620 of the general cleaner may receive the infrared ray signals emitted in a plurality of directions, and a controller of the general cleaner 100 may detect an intensity of each signal to detect a relative position of the cleaner body of the robot cleaner with respect to the charging station.

However, such a method of detecting a position of the charging station by using only the infrared ray sensors has a limitation that a distance between the charging station and the cleaner body cannot be precisely detected, because a received infrared ray signal is sorted as a strong signal or a weak signal. Further, since the infrared ray sensors provided at the charging station emit infrared ray signals within a large range, even if the infrared ray signal receiving portion of the cleaner receives the infrared ray signals, a relative direction of the charging station with respect to the cleaner body cannot be detected.

Figure 7:
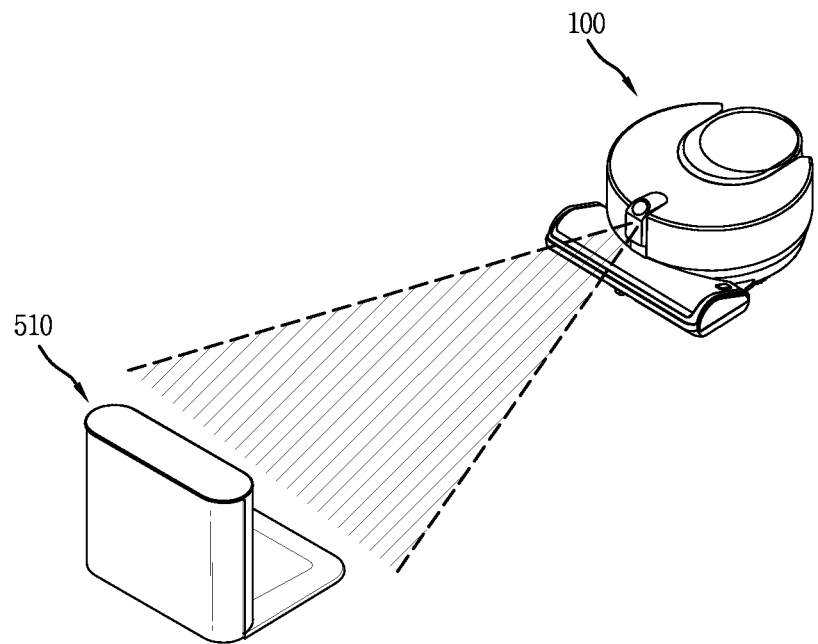
FIG. 7 is a conceptual view showing a method of performing a docking operation between a cleaner and a charging station according to the present disclosure.
Figure 8:
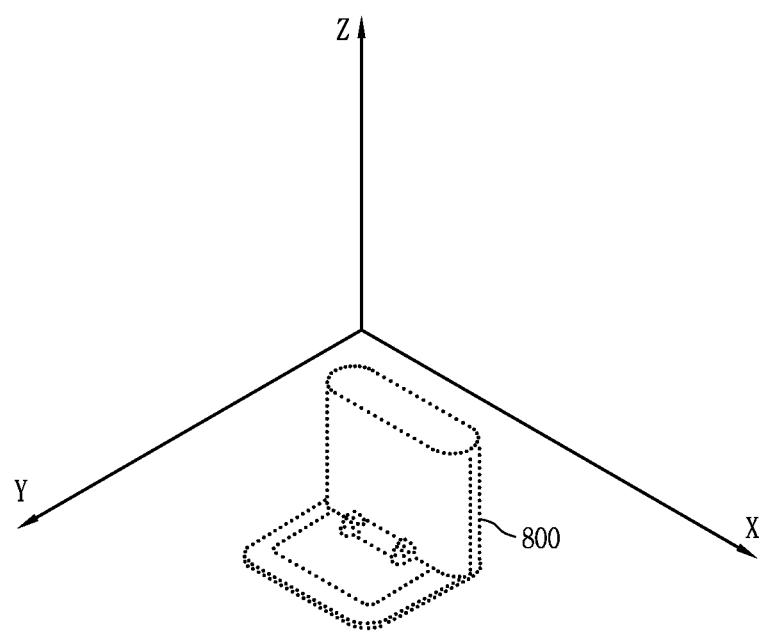
FIG. 8 is a conceptual view showing a set of three-dimensional (3D) coordinates information related to a charging station.

In order to solve such limitations, the present disclosure provides a method of detecting a relative position of the charging station with respect to the cleaner body of the robot cleaner 100, by using the 3D camera sensor provided at the robot cleaner 100. Referring to FIG. 7, the 3D camera sensor may be installed at a part of the cleaner body of the robot cleaner 100, and may detect 3D coordinates information related to the charging station 510. That is, the 3D camera sensor may detect 3D coordinates information on a plurality of regions included in an outer surface of the charging station 510, on the basis of the cleaner body. FIG. 8 shows a graph indicating such detected 3D coordinates information.

Figure 9A:
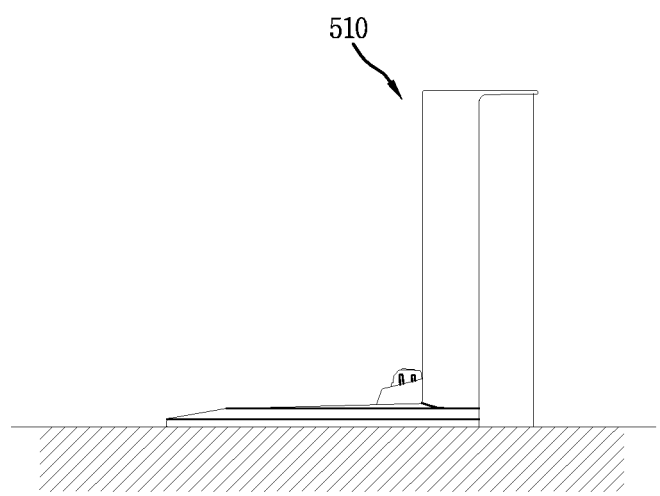
FIGS. 9A to 9C are views showing an appearance of a charging station according to the present disclosure.
Figure 9B:
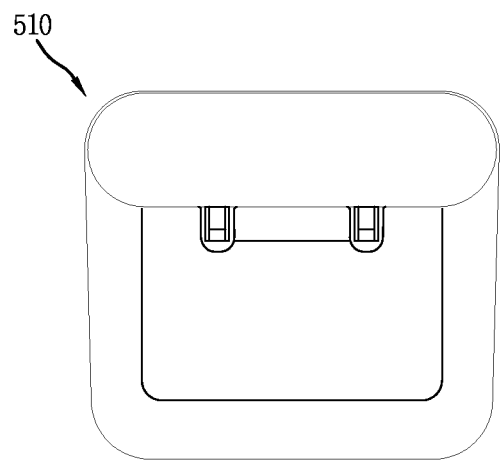
Figure 9C:
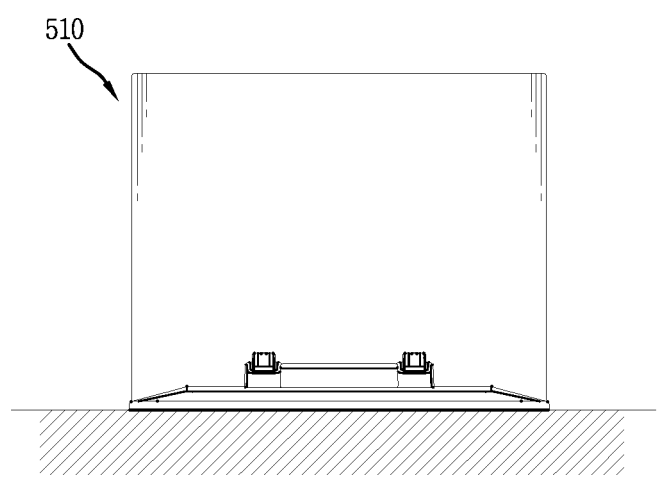
Figure 10:
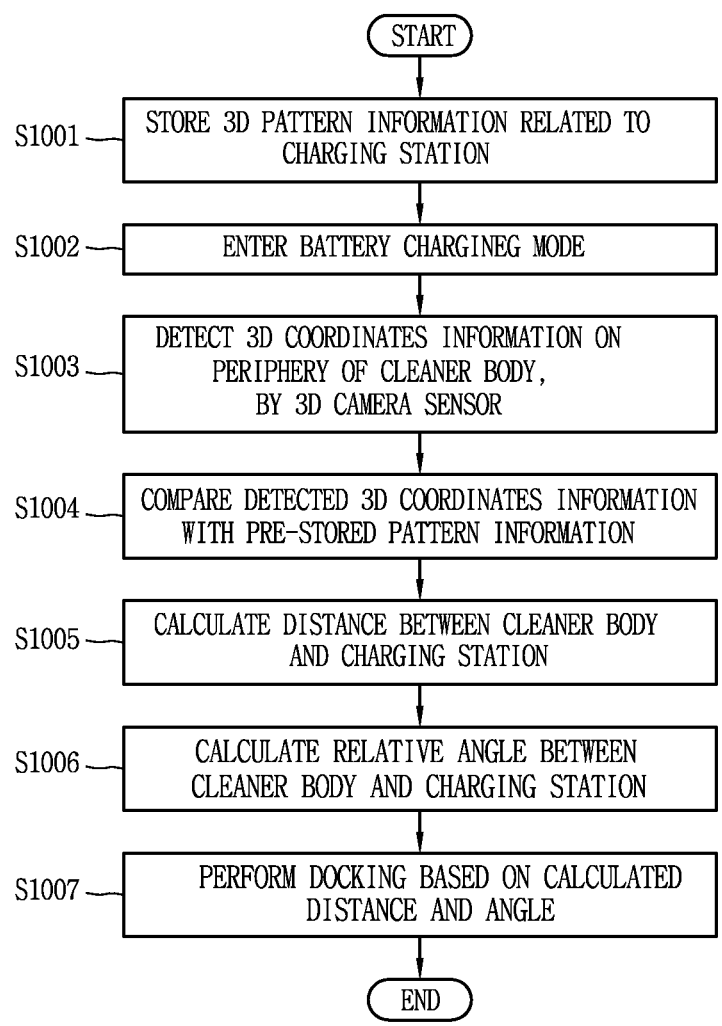
FIG. 10 is a flowchart showing a method of controlling a cleaner which performs an autonomous driving, according to the present disclosure.

FIG. 10 illustrates a method of controlling the robot cleaner 100 according to the present disclosure. Firstly, the memory 1700 may store therein 3D pattern information related to the charging station (S1001). The 3D pattern information stored in the memory 1700 may correspond to an appearance of the charging station, as shown in FIGS. 9A to 9C. If a specific pattern is formed at a part of the appearance of the charging station, the 3D pattern information may correspond to the specific pattern.

If a remaining amount of the battery is less than a limited (or lower threshold) value, the controller 1800 may control the driving unit 1300 such that the robot cleaner 100 enters a battery charging mode (S1002). That is, if a remaining amount of the battery is less than a limited value, the controller 1800 may control the driving unit 1300 such that the cleaner body of the robot cleaner 100 may move to a region around an installation position of the charging station, based on a map including information on the installation position of the charging station.

The 3D camera sensor included in a sensor 1400 may detect 3D coordinates information related to an object near the cleaner body of the robot cleaner 100 (S1003). After the robot cleaner 100 enters the battery charging mode, the controller 1800 may compare the 3D coordinates information detected by the 3D camera sensor, with the 3D pattern information stored in the memory 1700 and related to the charging station (S1004).

More specifically, if the detected 3D coordinates information matches the 3D pattern information, the controller 1800 may determine that the charging station 510 is positioned near the cleaner body of the robot cleaner 100. If it is determined that the charging station 510 is positioned near the cleaner body of the robot cleaner 100, the controller 1800 may detect a relative position of the charging station 510 with respect to a current position of the cleaner body. The controller 1800 may control the driving unit 1300 such that the cleaner body of the robot cleaner 100 may be docked at the charging station 510, based on the detected relative position.

That is, the controller 1800 may calculate a distance between the cleaner body of the robot cleaner 100 and the charging station, based on the detected 3D coordinates information (S1005). The controller 1800 may control the driving unit 1300 such that the cleaner body may be docked at the charging station, based on the calculated distance.

In an embodiment, based on the detected 3D coordinates information, the controller 1800 may calculate a distance between a charging terminal (not shown) provided at the cleaner body and for receiving a power, and a power supplying terminal provided at the charging station 510 and for supplying a power. And the controller 1800 may control the driving unit 1300 such that the cleaner body may be docked at the charging station, based on the distance between the charging terminal and the power supplying terminal.

Further, the controller 1800 may calculate a relative angle (or direction) of the charging station with respect to the cleaner body of the robot cleaner (S1006). That is, the controller 1800 may calculate an angle formed by a direction of one surface of the cleaner body and a direction of one surface of the charging station, based on the detected 3D coordinates information. Then, the controller 1800 may control the driving unit 1300 based on the calculated angle.

In an embodiment, the controller 1800 may calculate an angle formed by a current moving direction of the cleaner body and a direction of one surface of the charging station where the power supplying terminal is installed. In another embodiment, the controller 1800 may calculate an angle formed by a direction of a front surface of the cleaner body and a direction of one surface of the charging station where the power supplying terminal is installed. Further, the controller 1800 may control the driving unit 1300 such that the robot cleaner 100 may be docked at the charging station 510, based on the calculated distance and angle (S1007).

If the detected 3D coordinates information does not match the pre-stored 3D pattern information, the controller 1800 may determine that the cleaner body of the robot cleaner 100 and the charging station 510 are spaced from each other by more than a limited distance. Here, the "limited" distance means a maximum distance between the robot cleaner and the charging station for docking. That is, the limited distance means a distance between the cleaner body and the charging station, where a probability of a successful docking is lower than a predetermined value.

Thus, when the cleaner body is spaced from the charging station by more than the reference distance, the controller 1800 may control the driving unit 1300 such that the cleaner body may move to a position where a distance between the cleaner body and the charging station is less than the reference distance. In this case, the controller 1800 may control the driving unit 1300 such that the cleaner body of the robot cleaner 100 may move, from a current position, by more than the reference distance.

Further, the controller 1800 may determine whether the charging station is positioned near the cleaner body of the robot cleaner 100, by using at least one of the 3D camera sensor and the infrared ray sensor. In an embodiment, the controller 1800 may determine that the charging station is positioned near the cleaner body of the robot cleaner 100, if the infrared ray signal receiving portion senses an infrared ray signal emitted from the charging station. Further, if the infrared ray signal receiving portion senses the infrared ray signal emitted from the charging station, the controller 1800 may activate the 3D camera sensor such that the 3D camera sensor may sense 3D coordinates information related to the charging station.

In another embodiment, the controller 1800 may determine that the charging station is positioned near the cleaner body of the robot cleaner 100, if the communication unit receives a short-distance signal transmitted from the charging station. More specifically, the controller 1800 may determine a type of a signal that the communication unit 1100 has received from the charging station 510.

Further, the controller 1800 may activate the 3D camera sensor based on the determined type of the signal. That is, the controller 1800 may determine whether a reception signal of the communication unit 1100 from the charging station 510 is a long-distance signal or a short-distance signal. If the reception signal is a long-distance signal, the controller 1800 may control the driving unit such that the cleaner body of the robot cleaner may move to an installation position of the charging station 510.

The controller 1800 may periodically determine a type of a reception signal of the communication unit 1100 from the charging station 510. Further, the controller 1800 may activate the 3D camera to acquire 3D coordinates information related to the charging station, at a time point when it is determined that the reception signal includes a short-distance signal.

In the present disclosure, since 3D coordinates information acquired by the 3D camera sensor is used, a probability to return to the charging station may be enhanced. Further, in the present disclosure, since 3D coordinates information acquired by the 3D camera sensor is used, a probability to contact the power supplying terminal provided at the charging station with the charging terminal provided at the cleaner body of the robot cleaner may be enhanced. Further, in the present disclosure, since a position of the charging station is detected by using the conventional 3D camera sensor provided at the robot cleaner in order to sense an obstacle, an additional sensor needs not be installed at the charging station. Further, an erroneous detection of a position of the charging station, or failure in returning to the charging station, due to a signal disturbance of the infrared ray sensor, may be solved.

Therefore, the present disclosure provides a cleaner capable of precisely detecting a position of a charging station, by using a 3-dimensional (3D) camera sensor which acquires 3D coordinates information related to a terrain feature or an obstacle around a moving robot or a robot cleaner, and a method for controlling the same. The present disclosure also provides a cleaner which performs an autonomous driving, capable of enhancing a possibility to return to a charging station, based on 3D coordinates information obtained by a 3D camera sensor, and a method for controlling the same. The present disclosure further provides a cleaner which performs an autonomous driving, capable of precisely performing a docking operation with a charging station, based on 3D coordinates information obtained by a 3D camera sensor, and a method for controlling the same.

To achieve these and other aspects of the present disclosure, as embodied and broadly described herein, there is provided a cleaner which performs an autonomous driving, including: a cleaner body, a motor that moves the cleaner body; a sensor that detects three-dimensional (3D) coordinate information associated with a region within a range of the sensor; a memory that stores pattern information related to an appearance of a charging station; and a controller that compares the detected 3D coordinate information with the pattern information related to the charging station and determines that the charging station is positioned within the region when detected the 3D coordinate information corresponds to the pattern information related to the charging station.

To achieve these and other aspects of the present disclosure, as embodied and broadly described herein, there is provided a cleaner which performs an autonomous driving, including: a cleaner body; a motor that moves the cleaner body; a transceiver that receives a signal emitted from with a charging station when the cleaner body is within a threshold distance of charging station; a sensor that detects three-dimensional (3D) coordinate information; a controller that selectively activates the sensor to detect the 3D coordinate information based on the transceiver receiving the signal emitted from the charging station, and controls the motor to move the cleaning body toward the charging station based on the 3D coordinate information.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cleaner which performs an autonomous driving, the cleaner comprising:
   a cleaner body;
   a motor that moves the cleaner body;
   a sensor that detects three-dimensional (3D) coordinate information associated with a region within a range of the sensor;
   a memory that stores pattern information related to an appearance of a charging station;
   a controller that compares the detected 3D coordinate information with the pattern information related to the charging station, and determines that the charging station is positioned within the region when the detected 3D coordinate information corresponds to the pattern information related to the charging station, and a transceiver that receives a signal emitted from the charging station, wherein the charging station emits a short-distance signal that is detectable by the transceiver within a first distance from the charging station, and a long-distance signal that is detectable by the transceiver within a second distance from the charging station that is greater than the first distance, and wherein the controller further determines whether the signal detected by the transceiver includes one or more of the long-distance signal or the short-distance signal, when the received signal includes the long-distance signal, manages the motor to move the cleaner body toward the charging station, and activates the sensor to acquire the 3D coordinate information associated with the charging station when the received signal includes the short-distance signal.

2. The cleaner of claim 1, wherein when the charging station is positioned within the region within the range of the sensor, the controller detects a relative position of the charging station from a current position of the cleaner body.

3. The cleaner of claim 2, wherein the controller further controls the motor to move the cleaner body to be docked at the charging station, based on the detected relative position of the charging station.

4. The cleaner of claim 1, wherein the controller further determines an direction between a surface of the cleaner body and a surface of the charging station based on the detected 3D coordinate information, and controls the motor based on the determined direction.

5. The cleaner of claim 1, wherein when the detected 3D coordinate information does not correspond to the pattern information, the controller determines that the cleaner body and the charging station are spaced apart from each other by more than a threshold distance.

6. The cleaner of claim 5, wherein when the cleaner body and the charging station are spaced apart from each other by more than the threshold distance, the controller further controls the motor to move the cleaner body to a position that is within the threshold distance of the charging station.

7. The cleaner of claim 1, wherein the charging station includes an infrared emitter that outputs an infrared signal, the sensor detects the infrared signal when the cleaner body is positioned within a range of the infrared emitter, and the controller further determines whether the charging station is positioned with a threshold distance of the cleaner body based on whether the sensor detects the infrared ray signal and the detected 3D coordinate information.

8. A cleaner which performs an autonomous driving, the cleaner comprising:

a cleaner body;

a motor that moves the cleaner body;

a sensor that detects three-dimensional (3D) coordinate information and a signal emitted from a charging station;

a controller that activates the sensor to detect the 3D coordinate information based on the sensor detecting the signal emitted from the charging station, and controls the motor to move the cleaning body toward the charging station based on the 3D coordinate information, wherein the charging station emits a short-distance signal that is detected by the sensor within a first distance from the charging station, and a long-distance signal that is detected by the sensor within a second distance from the charging station that is greater than the first distance, the controller further:

determines whether the signal from the charging station includes one or more of the long-distance signal or the short-distance signal, and activates the sensor to acquire the 3D coordinate information when the received signal includes the short-distance signal, and controls the motor to move the cleaner body toward the charging station further based on determining that the received signal includes the long-distance signal and does not include the short-distance signal.

9. The cleaner of claim 8, wherein, when controlling the motor, the controller detects a relative position of the charging station based on the 3D coordinate information, and controls the motor to move the cleaner body toward the charging station based on the relative position of the charging station.

10. The cleaner of claim 8, wherein, when controlling the motor, the controller determines an direction between a surface of the cleaner body and a surface of charging station based on the 3D coordinate information, and controls that motor to move the cleaner body toward the charging station based on the direction.

11. The cleaner of claim 8, wherein the controller further determines a charge level of a battery included in the cleaner, and controls the motor to move the cleaner body toward the charging station when the charge level of the battery is below a threshold level.

12. The cleaner of claim 8, wherein the controller evaluates the 3D coordinate information to identify the charging station from one or more objects included within a range of the sensor.

13. The cleaner of claim 8, wherein the charging station emits signals in a plurality of directions, and the controller is further configured to determine a relative position of the charging station based on one or more of the directions associated with one or more of the signals received by the transceiver.

14. The cleaner of claim 8, wherein controller further identifies an obstacle based on the 3D coordinate information, and controls the motor to move the cleaning body to the charging station via a path that bypasses the obstacle.

15. The cleaner of claim 8, wherein the sensor includes a 3D camera sensor.

16. The cleaner of claim 1, wherein the controller further determines a charge level of a battery that provides power to the motor, and controls the motor to move the cleaner body to move toward the charging station when the charge level of the battery is below a threshold level.

17. The cleaner of claim 1, wherein controller further identifies an obstacle based on the 3D coordinate information, and controls the motor to move the cleaning body to the charging station via a path that bypasses the obstacle.

18. The cleaner of claim 1, wherein the charging station emits signals in a plurality of directions, the controller is further configured to determine a relative position of the charging station based on one or more of the directions associated with one or more of the signals received by the transceiver.

19. The cleaner of claim 8, wherein the charging station includes an infrared emitter that outputs an infrared signal, the sensor detects the infrared signal when the cleaner body is positioned within a range of the infrared emitter.

20. The cleaner of claim 19, wherein when the cleaner body and the charging station are spaced apart from each other by more than the range of the infrared emitter such that the sensor cannot detect the infrared signal, the controller further controls the motor to move the cleaner body toward the charging station.

* * * * *